United States Patent [19]

Chase et al.

[11] Patent Number: 4,582,090

[45] Date of Patent: Apr. 15, 1986

[54] TUBULAR MEMBER THREAD PROTECTOR

[75] Inventors: Kenneth V. Chase, Spring; Robert J. Campbell, Kingwood, both of Tex.

[73] Assignee: Hydril Company, Los Angeles, Calif.

[21] Appl. No.: 655,318

[22] Filed: Sep. 27, 1984

Related U.S. Application Data

[63] Continuation of Ser. No. 488,777, Apr. 26, 1983, abandoned.

[51] Int. Cl.$^4$ ............................................. B65D 59/06
[52] U.S. Cl. ..................................... 138/96 T; 138/89
[58] Field of Search ................... 138/89, 96 R, 96 T

[56] References Cited

U.S. PATENT DOCUMENTS

| | | | |
|---|---|---|---|
| 1,303,402 | 5/1919 | Schirra | 138/96 T |
| 2,022,189 | 11/1935 | Engstrom | 138/96 T |
| 2,316,013 | 4/1943 | Mulholland | 138/96 T |
| 2,523,930 | 9/1950 | Unke | 138/96 T |
| 2,989,087 | 6/1961 | Higgins | 138/96 T |
| 3,485,271 | 12/1969 | Halsey | 138/96 T |
| 4,020,873 | 5/1977 | Palarino | 138/96 T |
| 4,033,380 | 7/1977 | Weber | 138/96 T |
| 4,119,121 | 10/1978 | Smiley | 138/96 T |
| 4,139,023 | 2/1979 | Turley | 138/96 T |
| 4,173,988 | 11/1979 | Fowler | 138/96 T |
| 4,185,665 | 1/1980 | Flimon | 138/96 T X |
| 4,210,179 | 7/1980 | Galer | 138/96 T |
| 4,318,426 | 3/1982 | Callanan et al. | 138/96 T |
| 4,337,799 | 7/1982 | Hoover | 138/96 T |
| 4,349,048 | 9/1982 | Clark | 138/96 T |
| 4,379,471 | 4/1983 | Kuenzel | 138/96 T X |

Primary Examiner—James E. Bryant, III
Attorney, Agent, or Firm—Dodge, Bush & Moseley

[57] ABSTRACT

A thread protector structure is disclosed having a threaded body structure for threading about the threaded end surface of a tubular member. A sealing structure connected to and extending inwardly beyond the thread length has at least one resilient circumferential protrusion for circumferentially sealing about the tubular member. Another sealing structure is provided for sealing about the end of the tubular member.

2 Claims, 2 Drawing Figures

TUBULAR MEMBER THREAD PROTECTOR

This application is a continuation, of application Ser. No. 488,777, filed Apr. 26, 1983 now abandoned.

BACKGROUND OF THE INVENTION

1. Field of the Invention

This invention relates generally to a novel thread protector for threaded and other machined surfaces on the ends of the tubular members. In particular, the invention relates to thread protectors adapted for protecting threaded and machined surfaces on the end of oilfield tubular members against corrosion and damage during shipment and handling prior to their being threadedly coupled with other tubular members for use in an oil or gas well.

2. Description of the Prior Art

Thread protectors have been used for many years to protect the ends of tubular members against damage during shipment and during handling on a drilling rig. Such protectors have been provided not only to protect against the corrosive atmosphere and materials which may be present during shipment and at a drilling location but also to protect the threaded and machined surfaces from damage caused by banging one tubular member against another, and the like. Such protectors have typically sealed at the end of the tubular member by butting against a machined surface or feature and likewise have sealed against some feature such as a shoulder or inclined sealing surface inwardly beyond the thread length.

There has developed a need however, for a thread protector which provides environmental and damage protection for a threaded end surface of a tubular member having no feature against which to seal. Thus, it is an object of this invention to provide a thread protector for threaded tubular members which seals the threads and machined surfaces of the tubular members by contacting and sealing against the "as rolled" pipe body axially inwardly beyond the thread length of the threaded surface.

It is a further object of the invention to provide a thread protector which circumferentially seals about a cylindrical machined surface inwardly of the thread length provided on the end of a tubular member.

SUMMARY OF THE INVENTION

These objects as well as other advantages and features of the invention result from a protector means for protecting threads and machined surfaces provided about the end of a tubular member where the threads of the tubular member extend axially along the end of the tubular member from an outward point adjacent the end of the tubular member to an inward point defined by the thread length. The protector means comprises a threaded body means for threadingly engaging the threads at the end of the tubular member, a first sealing means connected to the body means for sealing about the end of the tubular member and a second sealing means connected to the body means and having at least one resilient circumferential protrusion for circumferentially sealing about the tubular member inwardly beyond the thread length.

The resilient circumferential protrusion seal may be adapted to seal about the "as rolled" tubular body beyond the thread length or it may be adapted to seal about a machined cylindrical surface about the tubular body beyond the thread length. Where the tubular member has external threads, the threaded body means has a threaded interior surface adapted to engage with the tubular member threads and the first sealing means is an interior shoulders of the body means adapted to abut the end of the tubular member when the threaded body is fully engaged with the tubular member threads. Where the threads of the tubular member are internal threads, the threaded body means of the protector has a threaded exterior surface adapted to engage with the tubular member threads an the first sealing means is an external shoulder adapted to abut the end of the tubular member when the threaded body means is fully engaged with the tubular member threads.

The second sealing means of the thread protector adapted to engage external threads on the end of a tubular member is preferably a plurality of axially spaced inwardly facing circumferential protrusions adapted to circumferentially seal about the exterior of the tubular member inwardly beyond the thread length, the protrusions being integral with a circumferential extension of the body means.

Where the protector is adapted to protect internal threads on the end of a tubular member the second sealing means is preferably a plurality of axially spaced outwardly facing circumferential protrusions adapted to circumferentially seal about the interior of the tubular member axially inwardly beyond the thread length, again the protrusion being integral with a circumferential extension of the body means.

Where the protector is adapted to protect external threads, the body means has a first section means of generally cylindrical shape having threads provided on a cylindrical wall thereof and fabricated of resilient plastic for threadingly attaching the protector to the end of the tubular member. A second section means fabricated of metal and secured to the first section means at least partially about the first section means is provided for rigidity and structural protection to the first section means.

In the preferred embodiment of the invention adapted for protecting external threads and machined surfaces, the second section means or metallic jacket is secured to an external cylindrical wall of the first section means and extends axially about the external cylindrical wall to a point approximately at the beginning of the circumferential extension of the first section means, whereby the circumferential extension is free to flex while sealing about the tubular member inwardly beyond the thread length as the protector means is threaded about the end of the tubular member.

In the preferred embodiment of the invention adapted to seal about internal threads within the end of a tubular member, the second section means or metallic jacket is secured to an internal cylindrical wall of the first section means and extends axially about the internal cylindrical wall to a location approximately at the beginning of the circumferential extension of the first section means, whereby the circumferential extension is free to flex while sealing about the interior surface of the tubular member inwardly beyond the thread length as the protector means is threaded to the end of the tubular member.

Preferably in both preferred embodiments of the invention, the first section means of the body means is fabricated from a resilient plastic such as urethane, the second section fabricated from a metal such as steel.

BRIEF DESCRIPTION OF THE DRAWING

The foregoing summary of the invention and other objects and advantages of the invention will be described in more detail below taken in conjunction with the accompanying drawing of which.

DESCRIPTION OF THE INVENTION

Figure 1:
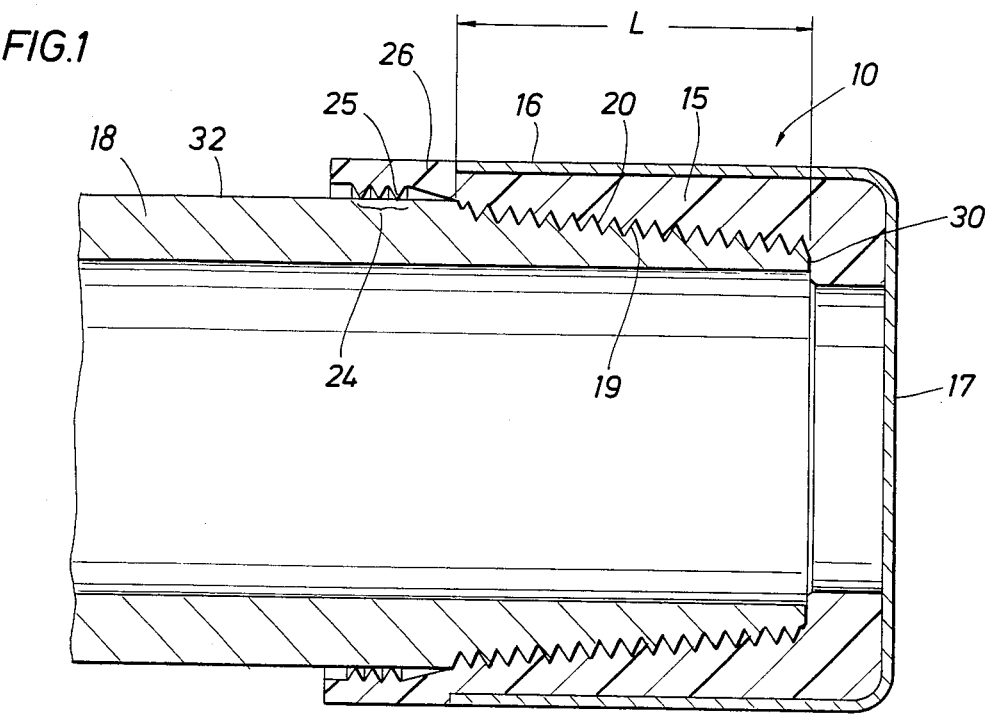
FIG. 1 illustrates the thread protector according to the invention adapted to seal about a pin or external threaded portion and machined surfaces provided about the end of a tubular member.

FIG. 1 illustrates the embodiment of the thread protector according to the invention adapted to seal about threads 19 and machined surfaces provided about the exterior end surface of the tubular member 18. The thread protector includes a cylindrical body 15 which has threads 20 provided about its interior surface which are adapted to at least partially engage the threads 19 on the end of tubular member 18. Although the threads illustrated may be typical API threads commonly used in oilfield tubular members, the threaded surfaces 19 may be two step cylindrical threads or any other threaded surface. The threads 20 on the interior of the cylindrical body means 15 must of course be adapted to engage the particular kinds of thread 19 on the end of the tubular member 18.

A first sealing means 30 is provided for sealing about the end of tubular member 18. In the embodiment illustrated in FIG. 1, the first sealing means 30 is an internal shoulder provided in the interior end of the threaded body means 15. Of course the first sealing means 30 may be advantageously provided to seal against any end surface which may be machined on the end of tubular member 18. For example, a reverse angle shoulder may be provided as the first sealing means 30 to cooperate with a reverse angle torque shoulder provided at the end of the tubular member 18.

A second sealing means 24 is provided on a circumferential extension 26 of the threaded body means 15. At least one circumferential protrusion 25 is provided for sealing against the "as rolled" exterior surface 32 of tubular member 18. Although a single circumferential protrusion may seal the thread protector against corrosive fluids or atmosphere gases which could contaminate the threaded or other machined surfaces on the end of the tubular member, a plurality of circumferential protrusions or "teeth" are preferred for redundancy to assure that the threads are sealed. The circumferential extension 26 is provided axially inwardly beyond the thread length L of the threaded portion of the threaded body means 15 as illustrated in FIG. 1.

Preferably, the threaded body means 15 is fabricated from a resilient plastic such as urethane. The circumferential extension 26 which is integral to the threaded body means is likewise preferably constructed of the resilient plastic urethane. An outer jacket of metal 16 is provided to surround the threaded body means 15 providing rigidity and protection to the threaded body means 15 constructed of resilient plastic. Preferably the outer jacket 16 extends axially inwardly approximately to the length L of the thread length but does not extend to the circumferential extension 26 on which the circumferential sealing means 25 is provided. The absence of a steel jacket about the circumferential extension 26 assures that the circumferential extension 26 and the circumferential protrusions 25 may flex about the outer surface 32 of tubular member 18 as the protector means 10 is threadedly applied to the end of tubular member 18.

Although the preferred embodiment of the invention calls for metallic jacketing of the exterior of the threaded body means 15, including a bottom closure 17, a metallic insert may be embedded for rigidity and protection with in threaded body means 15 either in substitution for or in addition of the outer jacket 16. A hole may also be provided in the end of bottom closure 17 to provide air within tubular member 18, thereby preventing moisture from corroding the inside of member 18. Projections or geometrically shaped holes may also be provided in bottom closure 17 to cooperate with tools for mounting and unmounting the protector 10 about the end of tubular member 18.

Figure 2:
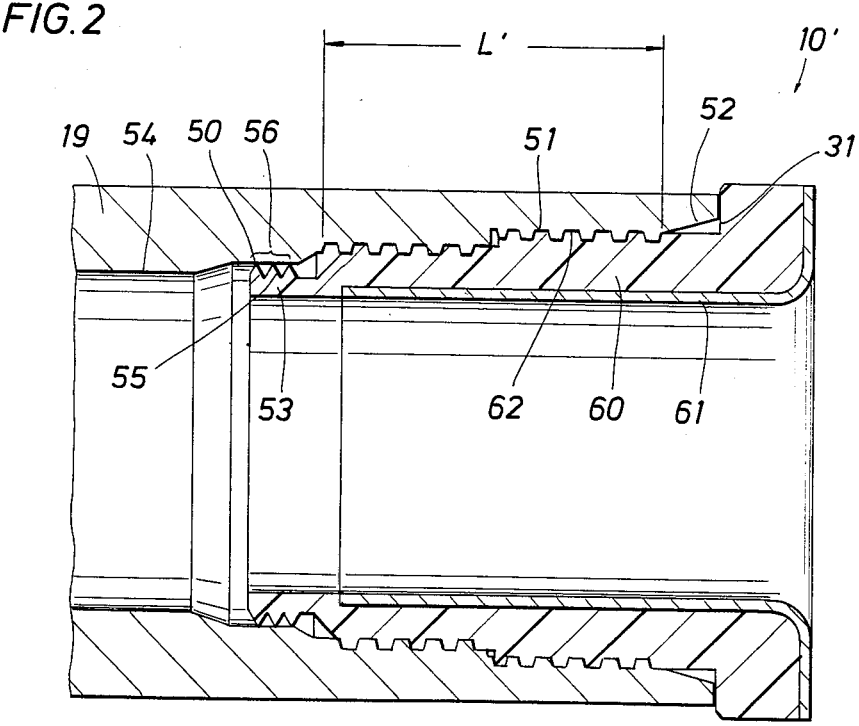
FIG. 2 illustrates an embodiment of the invention provided to seal about a box or internal threaded portion and machined surfaces provided within the end of a tubular member.

FIG. 2 illustrates an alternative embodiment of the invention in which a thread protector 10' is adapted to protect a box or internal thread 51 provided within the end of tubular member 19. As illustrated in FIG. 2, the threaded and machined portion of the box threads 51 extend axially inward a thread length L' at the end of tubular member 19. As illustrated, a machined sealing surface 52 may be provided on the extreme end of tubular member 19 and a machined surface 50 may be provided inwardly of the thread length L' about the circumferential interior of the tubular member 19.

In the embodiment of the invention illustrated in FIG. 2, the thread protector 10' includes a threaded body means 60 on which external threads 62 are provided to threadedly engage the particular internal threads 51 provided on the end of tubular member 19. (Although two step cylindrical threads are illustrated, other thread types may of course be used, such as API threads). An external shoulder 31 is provided on the outer end of the threaded body member 60 to abut against the end of the tubular member 19. As discussed above with regard to the embodiment of the invention illustrated in FIG. 1, the sealing means 31 may be provided to mate with the end surface of tubular member 19 such as a reverse angle torque shoulder.

A second sealing means 56 is provided on a circumferential extension 53 of the threaded body means 60. At least one outwardly facing circumferential protrusion 55 is provided for sealing against the interior cylindrical machined surface 50 of tubular member 19. Although a single circumferential protrusion may seal the thread protector against corrosive fluids or atmospheric gases which could contaminate the threaded or other machined surfaces within the end of the tubular member, a plurality of circumferential protrusions or "teeth" are prefered for redundancy to assure that the threaded surfaces are sealed. The circumferential extension 53 is provided axially inwardly beyond the thread length l' of the threaded portion of threaded body means 60 as illustrated in FIG. 2.

Preferably, the threaded body means 60 is fabricated from urethane as is the extension 53. An inner jacket of metal 61 is provided to surround the interior of threaded body means 60. Preferably, the inner jacket 61 extends axially inward approximately to the length l' of the thread length, but does not extend to the circumferential extension 53 on which the circumferential sealing means 56 is provided. The absence of a steel jacket about the circumferential extension 53 assures that the circumferential extension 53 and the circumferential protrusions 55 may flex about the machined surface 50 of tubular member 19 as the protector means 10' is threadedly applied to the end of tubular member 19. Extension member 53 and resilient sealing means 56 may alternatively be provided to seal about the unmachined interior surface 54 of tubular member 19. A cylindrical metallic insert may be embedded within threaded body means 60 in substitution for or in addition to the metallic inner jacket 61.

Various modifications and alterations in the described thread protector will be apparent to those skilled in the art from the foregoing description which does not depart from the spirit of the invention. The foregoing disclosure and description of the invention are illustrative and explanatory thereof and details of the illustrative embodiment may be made without departing from the spirit of the invention.

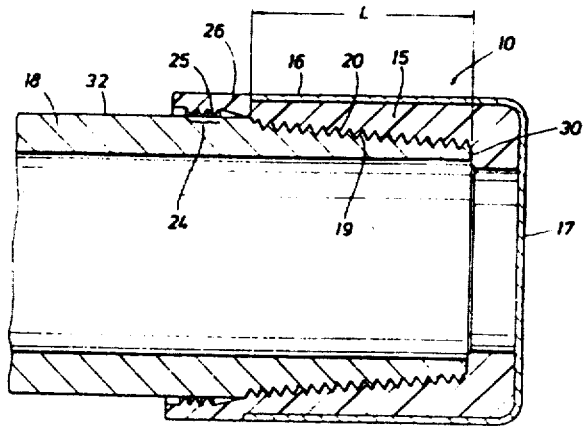

What is claimed is:

1. In combination with a tubular member having threads provided about its end, the threads of the tubular member extending axially along the end of the tubular member from an outward end of the threads near the end of the tubular member to an inward end of the threads defined by the thread length, the tubular member having a non-threaded surface extending axially inwardly beyond the thread length, a thread protector comprising, a body having threads in threaded engagement completely along the thread length of the threads of the tubular member, the body having a sealing surface at one end in sealing engagement with the end of the tubular member operably completely circumferentially sealing the threads of the tubular member from contaminant entry from said outward end of the threads, the body having an axially inward extending cylindrical extension at its other end which has at least one resilient protrusion completely circumferentially sealingly engaging said non-threaded surface of the tubular body operably sealing the threads of the tubular member from contaminant entry from said inward end of the threads, wherein the threads of the tubular member are external threads, the threads of the protector are internal threads, and the sealing surface at said one end of the body is an interior shoulder of the body sealingly abutting the end of the tubular member, and, wherein said body has a first section of generally cylindrical shape having said internal threads provided on an inner cylindrical wall thereof and fabricated of resilient plastic, said internal threads removably securing the protector to the end of the tubular member, said first section including said axially inwardly extending cylindrical extension of the first section, said extension beginning approximately at the inner axial extent of said threads of said first section, and a second section fabricated of metal and secured to the first section for providing rigidity and structural protection to the first section, the second section being secured to an external cylindrical wall of the first section and extending axially outwardly from an axial point approximately at the beginning of the circumferential extension of the first section, whereby the cylindrical extension is free to flex while the circumferential protrusions provided thereon seal about the tubular member axially inwardly beyond the thread length as the protector is threaded about the end of the tubular member.

2. In combination with a tubular member having threads provided about its end, the threads of the tubular member extending axially along the end of the tubular member from an outward end of the threads near the end of the tubular member to an inward end of the threads defined by the thread length, the tubular member having a non-threaded surface extending axially inwardly beyond the thread length, a thread protector comprising, a body having threads in threaded engagement completely along the thread length of the threads of the tubular member, the body having a sealing surface at one end in sealing engagement with the end of the tubular member operably completely circumferentially sealing the threads of the tubular member from contaminant entry from said outward end of the threads, the body having an axially inwardly extending cylindrical extension at its other end which has at least one resilient protrusion completely circumferentially sealingly engaging said non-threaded surface of the tubular body operably sealing the threads of the tubular member from contaminant entry said inward end of the threads, wherein the threads of the tubular member are internal threads, the threads of the protector are external threads, and the sealing surface at its end of the body is an exterior shoulder of the body sealingly abutting the end of the tubular member, and wherein the body means has a first section of generally cylindrical shape having threads provided on an outer cylindrical wall thereof and fabricated of resilient plastic, said external threads removably securing the protector to the end of the tubular member, said first section including said axially inwardly extending cylindrical extension of the first section, said extension beginning approximately at the inner axial extent of said threads of said first section, and a second section fabricated of metal and secured to the first section at least partially about the external wall of the first section for providing rigidity and structural protection to the first section, the second section secured to the internal cylindrical wall of the first section and extending axially outwardly from an axial point approximately at the beginning of the cylindrical extension of the first section, whereby the cylindrical extension is free to flex while sealing about the tubular member axially inwardly beyond the thread length as the protector is threaded about the end of the tubular member.

* * * * *

UNITED STATES PATENT AND TRADEMARK OFFICE
CERTIFICATE OF CORRECTION

PATENT NO. : 4,582,090

DATED : April 15, 1986

INVENTOR(S) : Kenneth V. Chase et al

It is certified that error appears in the above-identified patent and that said Letters Patent is hereby corrected as shown below:

The title page should be deleted to appear as per attached title page.

Signed and Sealed this

Second Day of September 1986

[SEAL]

Attest:

DONALD J. QUIGG

Attesting Officer

Commissioner of Patents and Trademarks

United States Patent

Chase et al.

Patent Number: 4,582,090
Date of Patent: Apr. 15, 1986

[54] TUBULAR MEMBER THREAD PROTECTOR

[75] Inventors: Kenneth V. Chase, Spring; Robert J. Campbell, Kingwood, both of Tex.

[73] Assignee: Hydril Company, Los Angeles, Calif.

[21] Appl. No.: 655,318

[22] Filed: Sep. 27, 1984

Related U.S. Application Data

[63] Continuation of Ser. No. 488,777, Apr. 26, 1983, abandoned.

[51] Int. Cl.⁴ .................................... B65D 59/06
[52] U.S. Cl. ........................... 138/96 T; 138/89
[58] Field of Search .................. 138/89, 96 R, 96 T

[56] References Cited

U.S. PATENT DOCUMENTS

| | | | |
|---|---|---|---|
| 1,303,402 | 5/1919 | Schirra | 138/96 T |
| 2,022,189 | 11/1935 | Engstrom | 138/96 T |
| 2,316,013 | 4/1943 | Mulholland | 138/96 T |
| 2,523,930 | 9/1950 | Unke | 138/96 T |
| 2,989,087 | 6/1961 | Higgins | 138/96 T |
| 3,485,271 | 12/1969 | Halsey | 138/96 T |
| 4,020,873 | 5/1977 | Palarino | 138/96 T |
| 4,033,380 | 7/1977 | Weber | 138/96 T |
| 4,119,121 | 10/1978 | Smiley | 138/96 T |
| 4,139,023 | 2/1979 | Turley | 138/96 T |
| 4,173,988 | 11/1979 | Fowler | 138/96 T |
| 4,185,665 | 1/1980 | Flimon | 138/96 T X |
| 4,210,179 | 7/1980 | Galer | 138/96 T |
| 4,318,426 | 3/1982 | Callanan et al. | 138/96 T |
| 4,337,799 | 7/1982 | Hoover | 138/96 T |
| 4,349,048 | 9/1982 | Clark | 138/96 T |
| 4,379,471 | 4/1983 | Kuenzela | 138/96 T X |

Primary Examiner—James E. Bryant, III
Attorney, Agent, or Firm—Dodge, Bush & Moseley

[57] ABSTRACT

A thread protector structure is disclosed having a threaded body structure for threading about the threaded end surface of a tubular member. A sealing structure connected to and extending inwardly beyond the thread length has at least one resilient circumferential protrusion for circumferentially sealing about the tubular member. Another sealing structure is provided for sealing about the end of the tubular member.

2 Claims, 2 Drawing Figures